ACQUISITION TECHNIQUE FOR TIME DIVISION MULTIPLE ACCESS SATELLITE COMMUNICATION SYSTEM

Filed Nov. 16, 1966

INVENTOR
JOHN G. PUENTE

BY Sughrue, Rothwell, Mion, Zinn & Macpeak

ATTORNEYS 3,530,252

ACQUISITION TECHNIQUE FOR TIME DIVISION MULTIPLE ACCESS SATELLITE COMMUNICATION SYSTEM

John G. Puente, Rockville, Md., assignor to Communications Satellite Corporation, a corporation of Washington, D.C.

Filed Nov. 16, 1966, Ser. No. 594,830
Int. Cl. H04j 3/06
U.S. Cl. 179—15 6 Claims

ABSTRACT OF THE DISCLOSURE

A method of permitting an earth station to initially access its assigned time slot in the satellite relay station in a time division multiple access satellite communication system without interferring with the transmissions of other earth stations in adjacent time slots. Low power accessing pulses are continuously transmitted from the station to the satellite. When a pulse is returned to the station, its position in the satellite time frame is observed. The phase of the access pulse is varied until it appears at the beginning of the time slot assigned to the station. At this time the station's next signal burst is transmitted and the burst will arrive in its assigned time slot when it reaches the satellite. The access pulse is of sufficiently low amplitude so that it does not interfere with the transmissions of other stations utilizing the other time slots in the satellite. The access pulse is of slightly longer duration than the intelligence bit pulses so that it will pass through a narrow band filter at the station and be distinguished from the intelligence bit pulses.

This invention relates generally to an improved method and apparatus for initially accessing the satellite in a time division multiple access satellite communication (TDMA) system and, more particularly, to such a method wherein an access pulse, which is low in power compared to the intelligence bit pulses, is transmitted to the satellite and then relayed back to the transmitting station to determine the position of the access pulse within the satellite time frame.

The invention can be briefly and broadly summarized as an improved method and means for initially accessing a satellite in a TDMA satellite communication system by transmitting special accessing pulses to the satellite and observing at the station the positions of the access pulses within the satellite time frame. The time of the access pulse is varied until it appears in the station assigned time slot. The signal burst transmission of the station is then properly timed to arrive in the satellite in its assigned time slot. The amplitude of the access pulse is sufficiently low so that it does not interfere with the time slots assigned to other stations in the system.

Other objects, features and advantages of the invention will be apparent from the following more particular description of a preferred embodiment of the invention, as illustrated in the accompanying drawings.

Figure 1:
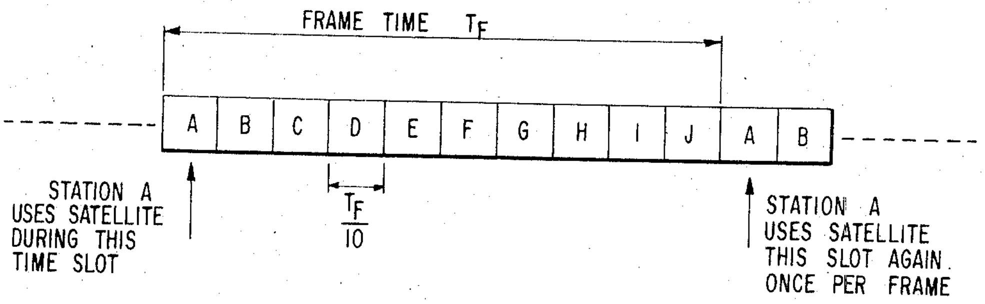
FIG. 1 is a schematic diagram of the satellite TDM time frame.

Let us consider a TDMA system having a fixed TDM frame time of 125 microseconds which is divided into ten equal time slots each assigned to a different one of ten earth stations. FIG. 1 is a diagrammatic representation of the satellite frame time for the ten stations identified as A, B . . . I, J. Let us assume the station E has been allocated a 12.5 microsecond time slot. An acquisition problem arises when stations D and F are already in communication with the satellite and are properly positioned within their assigned time slots by being locked in time position with respect to a reference, and station E wants to enter into communication, i.e., initially access the satellite.

Station E must enter in its allocated time slot in its initial acquisition attempt without overlapping other stations' time slots and disrupting their communications. The problem is difficult since the satellite is approximately 22,000 miles away in a synchronous orbit around the earth and is also moving slightly back and forth along a line extending generally from the satellite to the earth's center.

In a previous accessing method, one station, such as station A, was designated as the reference station and each station was assigned a unique word which was sent at the beginning of each transmission burst to identify that station's transmission. A slave station desiring initial access to the satellite would send only its unique word to the satellite. The unique word was aimed at the center of the station's assigned time slot. However, the use of this method required a great deal of computer time to predict the satellite's range at any time. The unique word was relayed back to the transmitting station where its position relative to a master station unique pulse was determined. The slave station unique word was then gradually adjusted in phase until it was positioned at the beginning of the assigned time slot. In this method, the transmit or carrier power had to be at the normal operating level during the initial acquisition step, and any error in the range predicting computer might cause the station's bursts to overlap other time slots and therefore interrupt communications already in progress between other stations.

In order to avoid this possibility, in the improved method low power access pulses of unmodulated RF are transmitted to the satellite, and then their positions within the satellite time frame are observed at the transmitting station after the access pulses are received from the satellite. The access pulses are moved until they appear at the beginning of the assigned time slot, at which time the station's burst transmission is initiated. The pulses are of sufficiently low power that they do not interfere with the communications of other stations when they appear in another station's time slot. The access pulses are made wider, i.e., longer in time, than the information bit pulses so that only the access pulses will pass through a narrow band pass filter in the ground station.

It has been experimentally determined that the power of the RF carrier for the accessing pulse should be 16 db down from the operating carrier levels of the stations already in communication with the satellite in order to obtain the desired carrier-to-noise ratio of 10 db. This measurement was made using a 16 megacycle input filter before the station demodulator with an operating bit rate of 6.176 megabits per second using NRZI coherent phase shift keying (PSK) modulation. The access pulse was 2 microseconds (approximately 12 bits) of unmodulated RF carrier.

In the improved method, a special access pulse is used rather than a coded unique word since the unique word would not be distinguishable from noise at the necessary low power level required for acquisition with this improved technique. The PSK demodulator in the earth station would not detect correctly a unique word 16 db down from the normal operating level. However, by transmitting a wide RF pulse, i.e., wide relative to the intelligence bits used in the communication system, at a level 16 db down from the normal operating carriers of the stations, the access pulse passes through a narrow band pass filter and is easily distinguishable from the noise and intelligence bits. Such a filter does not pass the intelligence bits from other stations with fidelity. It also functions to decrease the noise so that the access pulse becomes easily visible in the empty burst slot which it is desired to access.

Figure 2:
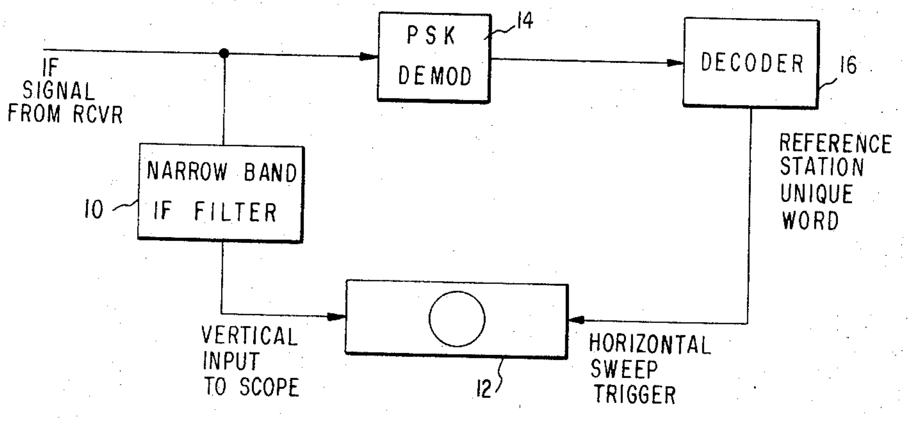
FIG. 2 is a block diagram of an apparatus which may be used at an earth station to implement the improved method.

FIG. 2 is a block diagram of an apparatus which implements the improved accessing technique. The signal from the station's receiver (not shown) is applied to a narrow band filter 10 which passes only the access pulses with fidelity and blocks noise and the narrower intelligence bit pulses. The output of the filter is applied to the vertical input of a scope 12. The signal is also passed through a PSK demodulator 14 whose output is fed to a decoder 16 which applies a signal representing the reference station's unique word to the horizontal sweep trigger of the scope 12.

Figure 3:
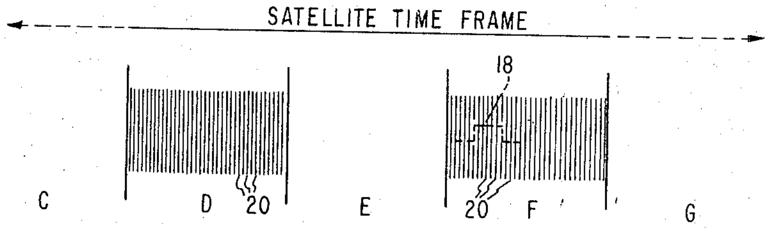
FIG. 3 is a schematic diagram showing the relative size and positions of the accessing pulse and the intelligence bit pulses.

A representation of the image on the scope is shown in FIG. 3. Stations D and F are already locked in position and are in communication with the satellite. When station E desires to initially access the satellite, it transmits to the satellite a low power accessing pulse 18. Pulse 18 is substantially wider than the intelligence bit pulses 20 used for normal communications with the satellite. Since pulse 18 easily passes through filter 10, it is visible even though it reaches the satellite in the time slot of station F, for example. In this improved method, the position of the access pulses transmitted by station E is adjusted until they appear at the beginning of time slot E. Then the station preamble word is transmitted and the station is turned on to full power so that lock-up occurs with the reference station with appropriate guard time. After lock-up, the channel intelligence bits are added to the preamble word. The station burst is maintained in synchronism by means of a novel synchronizer unit disclosed and claimed in a copending application by O. G. Gabbard, entitled Synchronizer for a Time Division Multiple Access Satellite Communication System and assigned to the assignee of this invention.

While the invention has been particularly shown and described with reference to a preferred embodiment thereof, it will be understood by those skilled in the art that various changes in form and details may be made therein without departing from the spirit and scope of the invention.

What is claimed is:

1. A method of initially accessing a satellite in a time division multiple access satellite communication system in which plural operating stations are transmitting information pulses to the satellite using a predetermined operating RF carrier power level comprising:

(a) transmitting from a new station desiring communication with the satellite an access pulse on an RF carrier of sufficiently lower power than said predetermined level so that the access pulse does not interfere with the communications of the other operating stations utilizing the satellite, said access pulse being of substantially longer time duration than said information pulses, and (b) detecting at said new station the position of the access pulse within the TDM time frame of the satellite.

2. A method of initially accessing a satellite as defined in claim 1 further comprising filtering out said access pulse before detecting.

3. A method of initially accessing a satellite as defined in claim 1 further comprising adjusting the transmission time of the access pulse until its detected position corresponds to a desired position within the time frame of the satellite.

4. An apparatus for initially accessing a satellite in a time division multiple access satellite communication system in which plural operating stations are transmitting information pulses to the satellite using a predetermined operating RF carrier power level comprising:

(a) means at a new station desiring access to the satellite for transmitting to the satellite an access pulse on an RF carrier having a power level sufficiently lower than said predetermined level so that the access pulse does not interfere with communications of said operating stations when it enters the satellite in TDM time slots assigned to said operating stations, said access pulse being substantially longer in time than said information pulses, and (b) means at said new station for comparing the phase of a received access pulse with the phase of a reference signal from one of said operating stations.

5. Apparatus as defined in claim 4 further comprising narrow band filter means at said new station for detecting the received access pulse.

6. Apparatus as defined in claim 5 wherein said comparing means comprises an image display means responsive to a reference signal from one of said operating stations and to the output of said filter means for displaying the position of said access pulse in the satellite time frame relative to said reference signal.

References Cited

UNITED STATES PATENTS

| | | | |
|---|---|---|---|
| 2,800,652 | 7/1957 | Dippy | 325—58 X |
| 3,320,611 | 5/1967 | Sekimoto | 343—6.5 |
| 3,418,579 | 12/1968 | Hultberg | 325—52 |

RALPH D. BLAKESLEE, Primary Examiner

U.S. Cl. X.R.

325—58; 343—6.5, 204